(12) United States Patent
Thomsen

(10) Patent No.: US 12,129,726 B2
(45) Date of Patent: Oct. 29, 2024

(54) HYDRAULICALLY DRIVEN DOWNHOLE SELF-PROPELLING WIRELINE TOOL

(71) Applicant: WELLTEC A/S, Allerød (DK)

(72) Inventor: Brian Engelbrecht Thomsen, Allerød (DK)

(73) Assignee: WELLTEC A/S, Allerød (DK)

( * ) Notice: Subject to any disclaimer, the term of this patent is extended or adjusted under 35 U.S.C. 154(b) by 0 days.

(21) Appl. No.: 17/962,920

(22) Filed: Oct. 10, 2022

(65) Prior Publication Data

US 2023/0112474 A1 Apr. 13, 2023

(30) Foreign Application Priority Data

Oct. 11, 2021 (EP) ..................................... 21202036
Nov. 29, 2021 (EP) ..................................... 21211117
Jun. 22, 2022 (EP) ..................................... 22180511

(51) Int. Cl.
*E21B 23/14* (2006.01)
*E21B 47/06* (2012.01)
(Continued)

(52) U.S. Cl.
CPC .............. *E21B 23/14* (2013.01); *E21B 47/06* (2013.01); *H02P 23/14* (2013.01); *H02P 29/10* (2016.02)

(58) Field of Classification Search
CPC .......... E21B 23/001; E21B 23/14; E21B 4/18; F16L 55/30; H02P 7/00; H02P 29/00; H02P 29/40
See application file for complete search history.

(56) References Cited

U.S. PATENT DOCUMENTS 6,467,557 B1 10/2002 Krueger et al.
9,097,086 B2 * 8/2015 AlDossary .............. E21B 23/14
(Continued)

FOREIGN PATENT DOCUMENTS

EP 2 505 772 10/2012

OTHER PUBLICATIONS

Extended European Search Report for EP21202036.6 dated Mar. 4, 2022, 8 pages.

*Primary Examiner* — Kenneth L Thompson
(74) *Attorney, Agent, or Firm* — Nixon & Vanderhye P.C.

(57) ABSTRACT

The present invention relates to a method for controlling a tool string having a downhole self-propelling wireline tool having wheels rotated by means of hydraulics and connected to projectable arm assemblies projected by hydraulics, comprising running a downhole self-propelling wireline tool into a wellbore, the downhole self-propelling wireline tool being connected to a second end of a wireline, and a first end of the wireline being connected to a power supply, the downhole self-propelling wireline tool having a tool body and a plurality of wheels rotated by means of hydraulics, and each wheel being connected to a projectable arm assembly projectable from the tool body by means of hydraulic fluid from a first hydraulic pump, the downhole self-propelling wireline tool having an electric motor rotating at an operational rotational speed for driving the first pump; supplying electric power to the downhole self-propelling wireline tool to operate the downhole self-propelling wireline tool at a first speed to urge the downhole self-propelling wireline tool through the wellbore at a first force; determining a motor output torque of the electric motor; determining a maximum allowable motor rotational speed based on the motor output torque; and comparing the operational rotational speed with the maximum allowable motor rotational speed, wherein the method further comprises adjusting the operational rota- (Continued)

Figure 1:
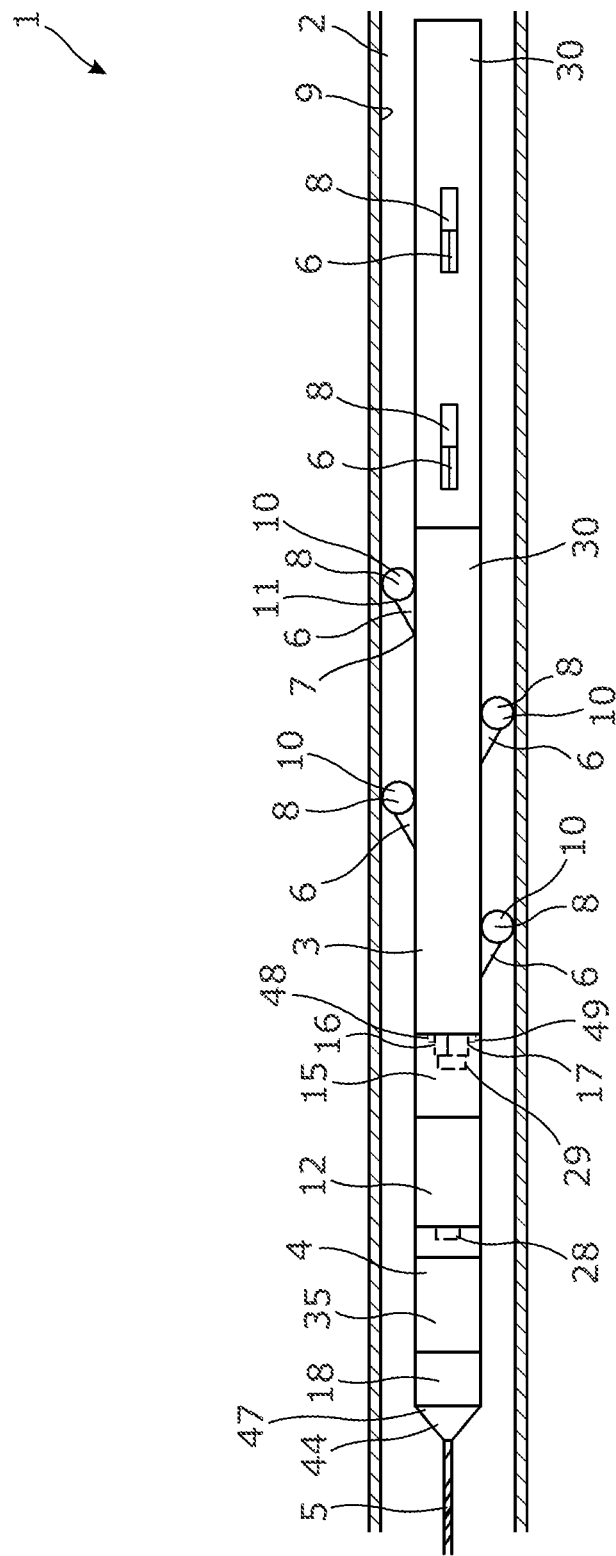

tional speed of the electric motor based on the comparison in order to adjust the first speed to a second speed if the operational rotational speed is higher than the maximum allowable motor rotational speed. The invention also relates to a hydraulically driven downhole self-propelling wireline tool configured to perform the method.

17 Claims, 8 Drawing Sheets

(51) Int. Cl.
*H02P 23/14* (2006.01)
*H02P 29/10* (2016.01)

(56) References Cited

U.S. PATENT DOCUMENTS

| | | | |
|---|---|---|---|
| 9,777,545 B2* | 10/2017 | Ludwig | E21B 4/006 |
| 9,890,602 B2* | 2/2018 | Guttormsen | E21B 23/00 |
| 9,920,613 B2* | 3/2018 | Lee | E21B 29/002 |
| 10,273,771 B2* | 4/2019 | Bonderover | E21B 4/18 |
| 10,927,925 B2* | 2/2021 | Armstrong | E21B 23/14 |
| 11,608,697 B2* | 3/2023 | Schroit | H02K 7/116 |
| 2005/0145415 A1 | 7/2005 | Doering et al. | |
| 2021/0123303 A1 | 4/2021 | Qi et al. | |
| 2021/0164309 A1 | 6/2021 | Ludwig et al. | |
| 2021/0351700 A1* | 11/2021 | Marti | H02M 3/158 |
| 2022/0275692 A1* | 9/2022 | Al-Mousa | E21B 41/0085 |
| 2023/0110460 A1* | 4/2023 | Andersen | E21B 23/14 166/381 |
| 2023/0112756 A1* | 4/2023 | Andersen | E21B 23/001 166/65.1 |

* cited by examiner

HYDRAULICALLY DRIVEN DOWNHOLE SELF-PROPELLING WIRELINE TOOL

This application claims priority to EP 22180511.2 filed Jun. 22, 2022, EP 21211117.3 filed Nov. 29, 2021 and EP 21202036.6 filed Oct. 11, 2021, the entire contents of each of which are hereby incorporated by reference.

The present invention relates to a method for controlling a tool string having a downhole self-propelling wireline tool having wheels rotated by means of hydraulics and connected to projectable arm assemblies projected by hydraulics. The invention also relates to a hydraulically driven downhole self-propelling wireline tool configured to perform the method.

Well intervention is carried out for various reasons to perform an operation such as pulling a sleeve, milling a nipple, pulling or setting a plug. Well intervention is often powered through a wireline, and the operational tool is propelled down the well by means of a self-propelling wireline tool for pulling the wireline as the operational tool is moved down the more inaccessible, deviated or horizontal part of the well to the position in which the operation is to be performed. In order to be able to provide sufficient pulling force for pulling the wireline far down the well, the self-propelling wireline tool is a hydraulically driven tool having wheels on wheel arms where each wheel is driven by a hydraulic motor in the wheel, and the wheel is pressed against the wall of the casing or the borehole also by means of hydraulics. Such hydraulically driven self-propelling wireline tools provide more pulling force than electrically driven self-propelling wireline tools but suffer from the inability to drive as fast as the electrically driven self-propelling wireline tools.

In order for the hydraulically driven self-propelling wireline tool to be able to drive faster, the hydraulic section of the hydraulically driven self-propelling wireline tool has been developed in several ways. One solution is that a front part of the hydraulically driven wheels has been disconnected so that all hydraulic power is used for driving the remaining wheels in order to drive faster, as known from WO2017/142415. Such solution is restricted to two modes, and thus two speeds: a fast mode where only some of the wheels are driven by the hydraulic fluid, and the other wheels are disconnected, and a full force mode where all wheels are driven by the hydraulic fluid, but at very slow speed. In WO2019/004834, the hydraulic section is provided with a bypass supply line also in order to bypass the front part of the hydraulic wheels instead of disconnecting the front part, which is thus an attempt to make the hydraulically driven self-propelling wireline tool drive faster, but with only a low pulling force; when more pulling force is needed, some wheels are no longer bypassed, and then the speed of the self-propelling wireline tool is reduced to a very low speed. In order to be able to better control the weight on bit, the hydraulic section in WO2018/067018 is provided with a pressure-setting valve which is configured for feeding excess hydraulic fluid into the first hydraulic supply line to press the wheels outwards to the second hydraulic supply line for driving the hydraulic motors in the wheels to increase the speed of the downhole tractor. However, feeding excess hydraulic fluid for pressing the wheels outwards to the fluid flow for the rotational force compromises the maximum pulling force. Despite several attempts to develop a faster hydraulically driven self-propelling wireline tool by way of a controllable hydraulic section, such hydraulically driven self-propelling wireline tool is either restricted to two modes or compromises the maximum pulling force.

The electrically driven self-propelling wireline tool suffers from the inability to provide sufficient pulling force to the electrically driven self-propelling wireline tool for the more inaccessible, deviated or horizontal parts of the well and cannot perform operations in these parts since the electrically driven self-propelling wireline tool cannot pull the wireline that far. Therefore, attempts have been made to make a partly hydraulically driven and partly electrically driven self-propelling wireline tool, but without any proven success so far.

It is an object of the present invention to wholly or partly overcome the above disadvantages and drawbacks of the prior art. More specifically, it is an object to provide an improved method of controlling a hydraulically driven downhole self-propelling wireline tool being able to drive faster without reducing the maximum pulling force.

It is an additional object to provide an improved method of controlling a hydraulically driven downhole self-propelling wireline tool being able to provide the maximum available pulling force due to current restriction in the wireline without reducing the ability to drive fast.

The above objects, together with numerous other objects, advantages and features, which will become evident from the below description, are accomplished by a solution in accordance with the present invention by a method for controlling a tool string having a downhole self-propelling wireline tool having wheels rotated by means of hydraulics and connected to projectable arm assemblies projected by hydraulics, comprising:

running a downhole self-propelling wireline tool into a wellbore, the downhole self-propelling wireline tool being connected to a second end of a wireline, and a first end of the wireline being connected to a power supply, the downhole self-propelling wireline tool having a tool body and a plurality of wheels rotated by means of hydraulics, and each wheel being connected to a projectable arm assembly projectable from the tool body by means of hydraulic fluid from a first hydraulic pump, the downhole self-propelling wireline tool having an electric motor rotating at an operational rotational speed for driving the first pump, defining the maximum allowable electric power usage of the wireline tool, supplying electric power to the downhole self-propelling wireline tool to operate the downhole self-propelling wireline tool at a first speed to urge the downhole self-propelling wireline tool through the wellbore at a first force, determining a first maximum allowable operational rotational speed of the electric motor based on the maximum allowable electric power usage at a first predetermined motor output torque of the electrical motor, determining a motor output torque of the electric motor, and comparing whether the operational rotational speed exceeds the maximum allowable operational rotational speed of the electrical motor at the determined motor output torque, wherein the method further comprises adjusting the operational rotational speed of the electric motor based on the comparison in order to adjust the first speed to a second speed if the operational rotational speed is higher than the maximum allowable motor rotational speed.

Thereby, a very simple way of adjusting the speed of the hydraulically driven downhole self-propelling wireline tool is provided as only the motor is adjusted, and the more complex hydraulic section is not adjusted to change the speed of the hydraulically driven downhole self-propelling wireline tool.

When operating a wireline tool, the wireline tool operates at a power that is limited by how much power can be delivered by the wireline. By defining the maximum allowable electric power usage of the wireline tool, it is possible to ensure that the wireline tool is operated at a power that does not exceed the power limits set by the wireline and/or the wireline tool.

Furthermore, by having the maximum allowable electric power usage of the wireline tool, it is possible to determine a first maximum allowable operational rotational speed of the electric motor at a predetermined motor output torque. Thus, when the motor is operating at a first motor speed, the maximum allowable electric power usage may be utilised to find the limit of how much torque the motor may have at the predetermined motor speed.

By determining the motor output torque of the electric motor during operation, it is possible to see whether the maximum allowable rotational speed exceeds the limit at the determined motor output torque. This may be done by comparing whether the operational rotational speed exceeds the maximum allowable operational rotation speed of the electrical motor at the determined motor output torque, and where the method adjusts the operational rotational speed to ensure that the operational rotational speed does not exceed the maximum operational rotational speed at the determined motor output torque.

Thus, it is ensured that the self-propelling wireline tool can adjust its motor speed during use to ensure that the electric motor operates within the power limits of the wireline. Thus, the method allows the wireline tool to be operated within the limits of the maximum allowable electric power usage, so that the components of the wireline tool are protected from being operated beyond their capacity.

The method may further comprise continuously determining the motor output torque from measurements of the electrical phases of the electric motor by calculations.

The method may further comprise calculating the maximum allowable operational rotational speed of the electric motor by using each determined motor output torque.

The maximum allowable electric power usage (effect) is given from the maximum allowable current allowed to flow in the wireline at a predetermined voltage and/or constant voltage, and by determining the determined (actual) motor output torque the maximum effect is divided by the actual motor output which results in a maximum allowable operational rotational speed of the electric motor.

If the operational rotational speed of the electric motor is higher than the maximum allowable operational rotational speed of the electric motor, the operational rotational speed of the electric motor may be reduced and if the operational rotational speed of the electric motor is lower than the maximum allowable operational rotational speed of the electric motor, the operational rotational speed of the electric motor may be increased.

The method may further comprise determining a second maximum allowable operational rotational speed of the electric motor based on the maximum allowable electric power usage at a second predetermined motor output torque of the electrical motor.

The method may likewise further comprise the determining of a third, fourth or a subsequent maximum allowable operational rotational speed of the electric motor based on the maximum allowable electric power usage at a third, fourth or subsequent predetermined motor output torque of the electrical motor.

The downhole self-propelling wireline tool may further comprise a pressure sensor continuously measuring a second fluid pressure of a second fluid for rotating the wheels and a hydraulic section comprising a first controllable valve controlling a first fluid pressure for projecting the arm assemblies based on the second fluid pressure.

The hydraulic section may merely adjust the first controllable valve for controlling the first fluid pressure based on the second pressure and thus optimising that sufficient power is provided to the wheel arms, but not more than needed. The speed of the hydraulically driven downhole self-propelling wireline tool is thus adjusted continuously using all available power, i.e. below the current limit, either for driving at a maximum speed or at the required force and the corresponding maximum allowable speed, and the hydraulically driven downhole self-propelling wireline tool is able to drive at maximum speed until the force to pull the wireline increases to a first force at the power limit curve, above which first force the speed, and thus the rotational speed of the electric motor, needs to be reduced so that the current limit is not exceeded. The hydraulically driven downhole self-propelling wireline tool thus controls itself to continuously adjust its speed to a maximum without exceeding the current limit of the wireline.

By having a first controllable valve controlling the first fluid pressure based on the second pressure, the continuous control of the hydraulically driven downhole self-propelling wireline tool is optimised even further to ensure that no power is wasted on projecting the arm assemblies out towards the wall of the well other than to the extent needed for optimal friction between the wheels and the wall to drive the hydraulically driven downhole self-propelling wireline tool forward.

Furthermore, adjusting the operational rotational speed of the electric motor based on the comparison may be performed independently of any condition of the wireline, such as drag in the wireline, wireline tension or wireline resistance.

Also, adjusting the operational rotational speed of the electric motor based on the comparison may be performed independently of any pump condition, such as pump flow, pump pressure or stroke length.

In addition, adjusting the operational rotational speed of the electric motor based on the comparison may be performed independently of any condition of the speed of the downhole self-propelling wireline tool.

Moreover, the first speed of the downhole self-propelling wireline tool may be adjusted to the second speed by adjusting the operational rotational speed of the electric motor.

Further, the method may also comprise determining the operational rotational speed of the electric motor.

Additionally, determining the output torque of the electric motor may be performed by measuring current over the three phases in the electric motor.

Furthermore, the method may also comprise measuring a current demand of/input to the electric motor and measuring a voltage input to the electric motor.

Also, determining the maximum allowable motor speed based on the motor output torque may be based on a measured current and a measured voltage of the electric motor.

In addition, by measuring the actual current demand and voltage of the electric motor, the maximum allowable motor speed can be determined more precisely as the efficiency of the electric motor varies depending on the operational rotational speed of the electric motor. Thus, at a high rotational speed the current demand is lower than at a low rotational speed for the same power output, and the maximum power may therefore be varied to be somewhat larger at high rotational speed than when assuming the maximum power is constant.

Moreover, the adjustment of the operational rotational speed of the electric motor may be based on a measured current demand of the electric motor or a calculated load on the electric motor.

Furthermore, the adjustment of the operational rotational speed of the electric motor may be performed continuously.

Further, the current demand of the electric motor may be measured by a motor driver at or in the electric motor.

Additionally, determining a maximum allowable motor rotational speed based on the motor output torque may also be based on a pre-set value for maximum power or maximum current.

Furthermore, each wheel may comprise a hydraulic motor for rotation of the wheel to provide a self-propelling movement, each wheel being connected with a second arm end of one of the projectable arm assemblies, the plurality of projectable arm assemblies being movably connected at a first arm end with the tool body and being projectable from the tool body by means of a first fluid having a first fluid pressure, and the downhole self-propelling wireline tool further comprising a pressure sensor continuously measuring the first fluid pressure.

Also, each hydraulic motor may be driven by a second fluid having a second fluid pressure from the first hydraulic pump or a second hydraulic pump driven by the electric motor.

In addition, the adjustment of the rotational speed of the electric motor may be based on the first fluid pressure.

Moreover, the method may further comprise controlling the first fluid pressure based on the second pressure by means of a first controllable valve in a hydraulic section of the downhole self-propelling wireline tool.

Further, the method may also comprise measuring the rotational speed of the electric motor.

Additionally, the method may further comprise determining the load on the motor based on the torque output.

Furthermore, the hydraulic section may comprise a first pressure sensor continuously measuring the second fluid pressure of the second fluid, and the adjustment of the operational rotational speed of the electric motor may be based on the second fluid pressure.

Also, the downhole self-propelling wireline tool may further comprise a machining tool for performing a machining operation and a compression sub comprising a load cell adjacent to the machining tool.

In addition, the downhole self-propelling wireline tool may further comprise a logging tool, and the operational rotational speed may be set at a predetermined constant operational rotational speed of the electric motor.

Moreover, the downhole self-propelling wireline tool may also comprise an operational tool having a bit for performing an operation downhole, such as milling, and the method may further comprise measuring the second fluid pressure and estimating a weight on bit (WOB), comparing the estimated weight on bit with a predetermined weight on bit, and adjusting the second fluid pressure based on the comparison.

Further, the downhole self-propelling wireline tool may also comprise a compression sub and an operational tool having a bit for performing an operation downhole, such as milling, and the method may further comprise measuring a weight on bit by means of the compression sub, comparing the measured weight on bit with a predetermined weight on bit, and adjusting the second fluid pressure based on the comparison.

Additionally, the downhole self-propelling wireline tool may further comprise a second hydraulic pump for generation of the first fluid pressure for projection of the plurality of projectable arm assemblies.

Furthermore, the hydraulic section may also comprise a second controllable valve controlling the second fluid pressure.

Also, the downhole self-propelling wireline tool may further comprise a compensator for providing a predetermined overpressure in the tool.

In addition, the downhole self-propelling wireline tool may further comprise a surface readout module for sending measured tool parameters, such as the first fluid pressure, the second fluid pressure, the operational rotational speed of the electric motor and the motor output torque, to surface.

Moreover, the electric motor may comprise a motor driver measuring an operational rotational speed of the electric motor.

Further, the electric control unit may be configured to determine a motor output torque of the electric motor.

Additionally, the electric control unit may comprise a capacitor functioning as an energy storage unit or accumulator.

Furthermore, the hydraulic section may also comprise a second pressure sensor.

Also, the controllable valve(s) may be (a) controllable pressure relief valve(s).

The invention further relates to a tool string comprising two downhole self-propelling wireline tools mounted as one wireline tool string, where each downhole self-propelling wireline tool has a separate electric control unit, a separate electric motor, one or two separate hydraulic pumps, a separate hydraulic section and one or more separate drive sections.

The invention also relates to a tool string comprising a first downhole self-propelling wireline tool, comprising:
  a tool body,
  an electric motor operating at a rotational speed and powered by a wireline,
  a plurality of projectable arm assemblies movably connected at a first arm end with the tool body and projectable from the tool body by means of a first fluid having a first fluid pressure,
  a plurality of wheels for contacting a wall of the well, each wheel comprising a hydraulic motor for rotation of the wheel to provide a self-propelling movement, each wheel being connected with a second arm end of one of the arm assemblies,
  a first hydraulic pump driven by the electric motor for generation of a second fluid pressure of a second fluid for driving the hydraulic motor(s) rotating the wheel(s), and
  a first pressure sensor continuously measuring the second fluid pressure, wherein the downhole self-propelling wireline tool further comprises a hydraulic section comprising a first controllable valve controlling the first fluid pressure based on the second fluid pressure,
wherein the tool string further comprises a second downhole self-propelling wireline tool, comprising:
  a tool body,
  a second electric motor operating at a rotational speed and powered by a wireline, a plurality of projectable arm assemblies movably connected at a first arm end with the tool body and projectable from the tool body by means of a third fluid having a third fluid pressure, a plurality of wheels for contacting a wall of the well, each wheel comprising a hydraulic motor for rotation of the wheel to provide a self-propelling movement, each wheel being connected with a second arm end of one of the arm assemblies, at least one second hydraulic pump driven by the second electric motor for generation of a fourth fluid pressure of a fourth fluid for driving the hydraulic motor(s) rotating the wheel(s), and a pressure sensor continuously measuring the fourth fluid pressure, wherein the second downhole self-propelling wireline tool further comprises a second hydraulic section comprising a third controllable valve controlling the third fluid pressure based on the fourth fluid pressure, the first downhole self-propelling wireline tool being in one end connected with the wireline and in another end with the second downhole self-propelling wireline tool.

Furthermore, the step of running may comprise running both the first and second downhole self-propelling wireline tools into a wellbore, and the step of supplying electric power may comprise supplying electric power to both the first and second downhole self-propelling wireline tools to operate the first and second downhole self-propelling wireline tools at a first speed to urge the tool string through the wellbore at a first force, and the step of determining may comprise determining a motor output torque of both the first and second electric motors, and the step of determining may comprise determining a maximum allowable motor rotational speed based on the motor output torque of both the first and second electric motors, and the step of comparing may comprise comparing the operational rotational speed of both the first and second electric motors with the maximum allowable motor rotational speed, and wherein the step of adjusting may comprise adjusting the operational rotational speed of both the first and second electric motors based on the comparison in order to adjust the first speed to a second speed if the operational rotational speed is higher than the maximum allowable motor rotational speed.

Furthermore, each electric motor may also comprise a power or current-limiting unit in order to distribute a first part of the current from the wireline to power the first electric motor and a second part of the current to power the second electric motor.

In addition, the first and second downhole self-propelling wireline tools may be electrically connected in parallel.

Moreover, the downhole self-propelling wireline tool may further comprise a current distribution unit in order to distribute a first part of the current from the wireline to power the first electric motor and a second part of the current to power the second electric motor.

Also, the downhole self-propelling wireline tool may comprise a current distribution unit instead of the power-limiting units in order to distribute a first part of the current from the wireline to power the first electric motor and a second part of the current to power the second electric motor.

Finally, the invention relates to a hydraulically driven downhole self-propelling wireline tool configured to perform the method described above.

Figure 2:
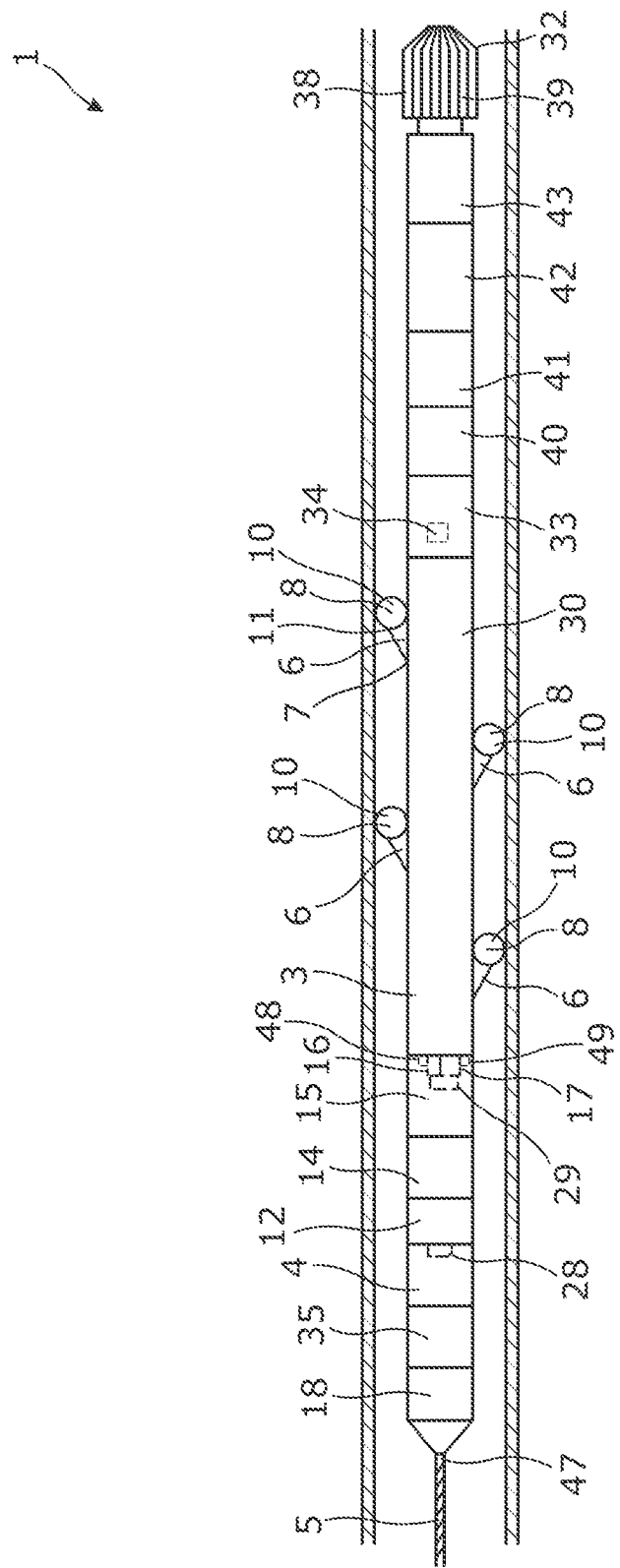
Figure 3:
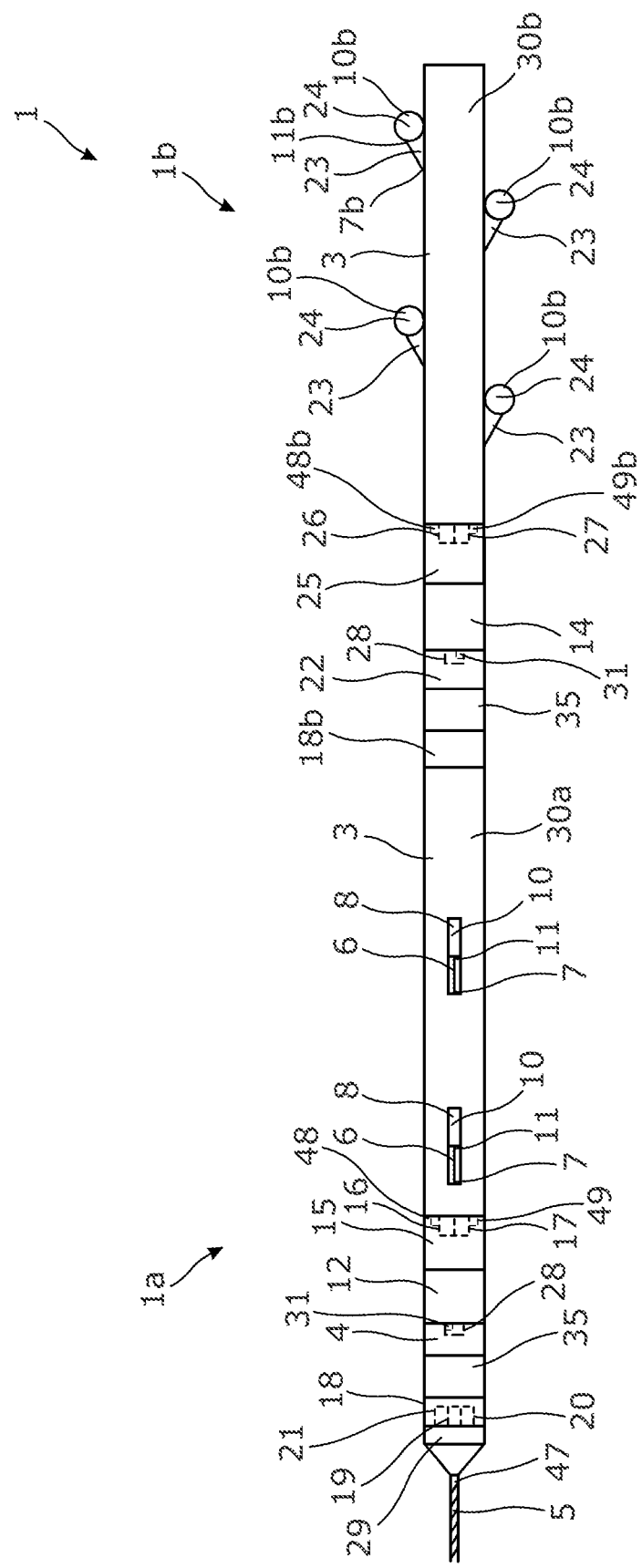
Figure 4:
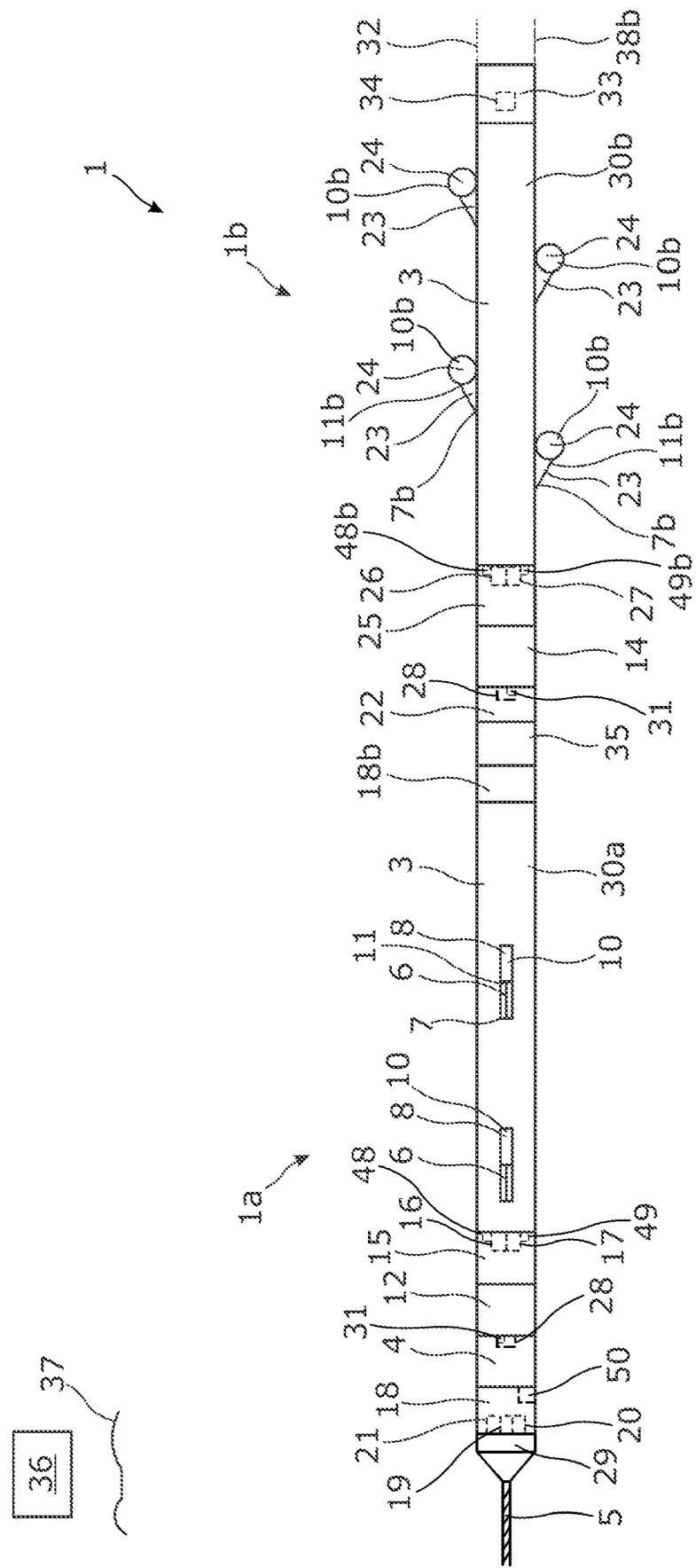
Figure 5:
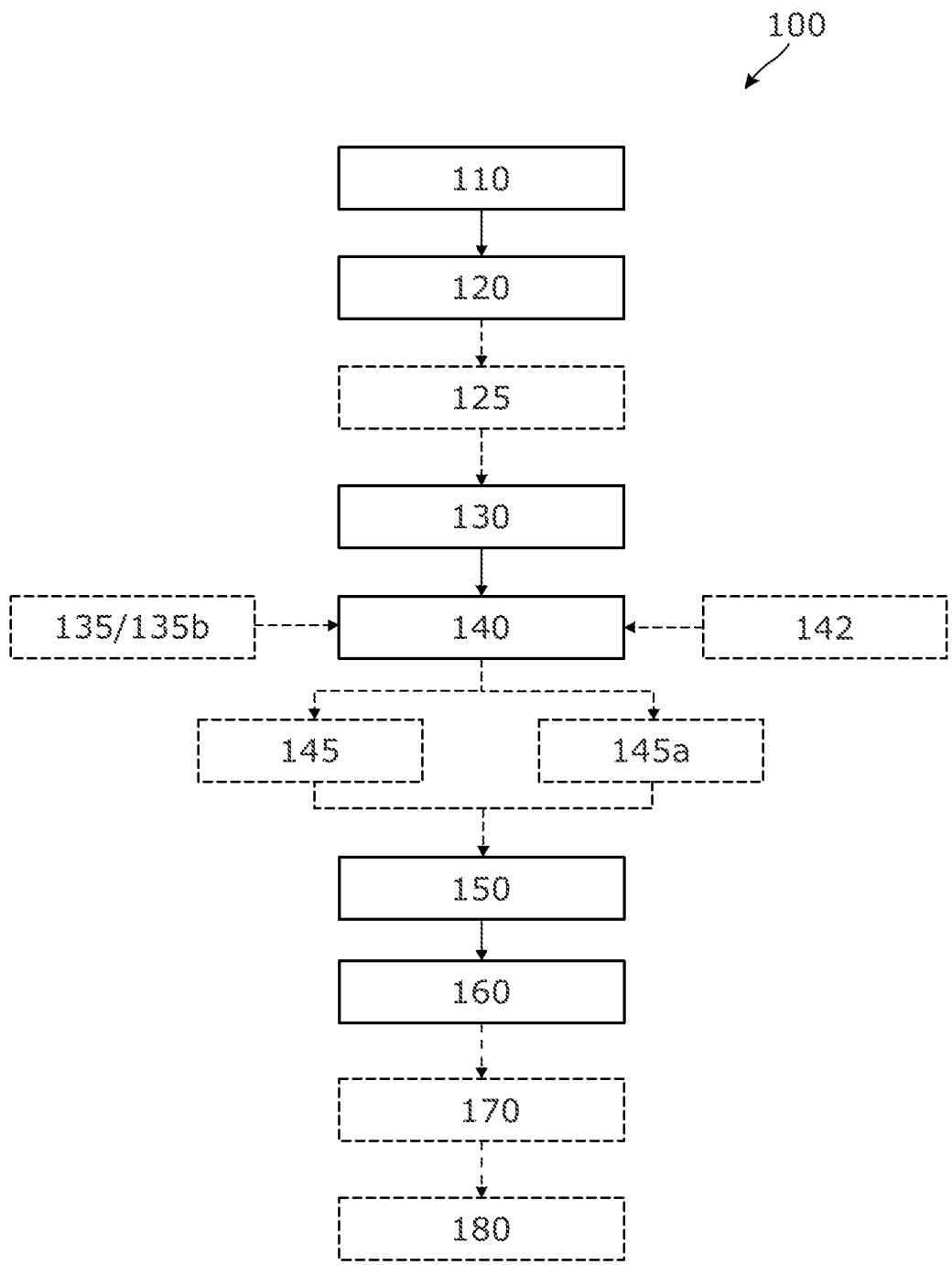
Figure 6:
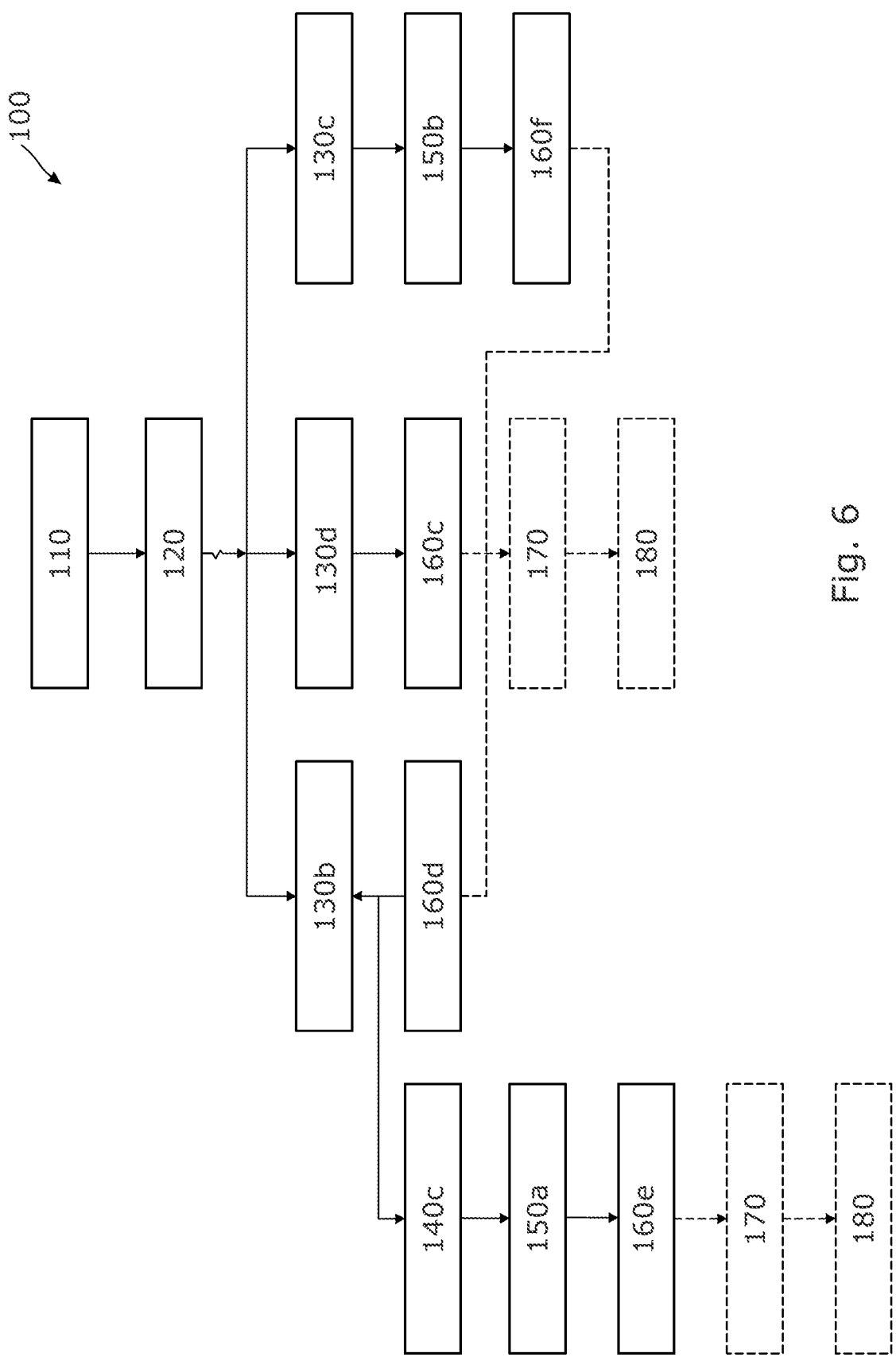
Figure 7:
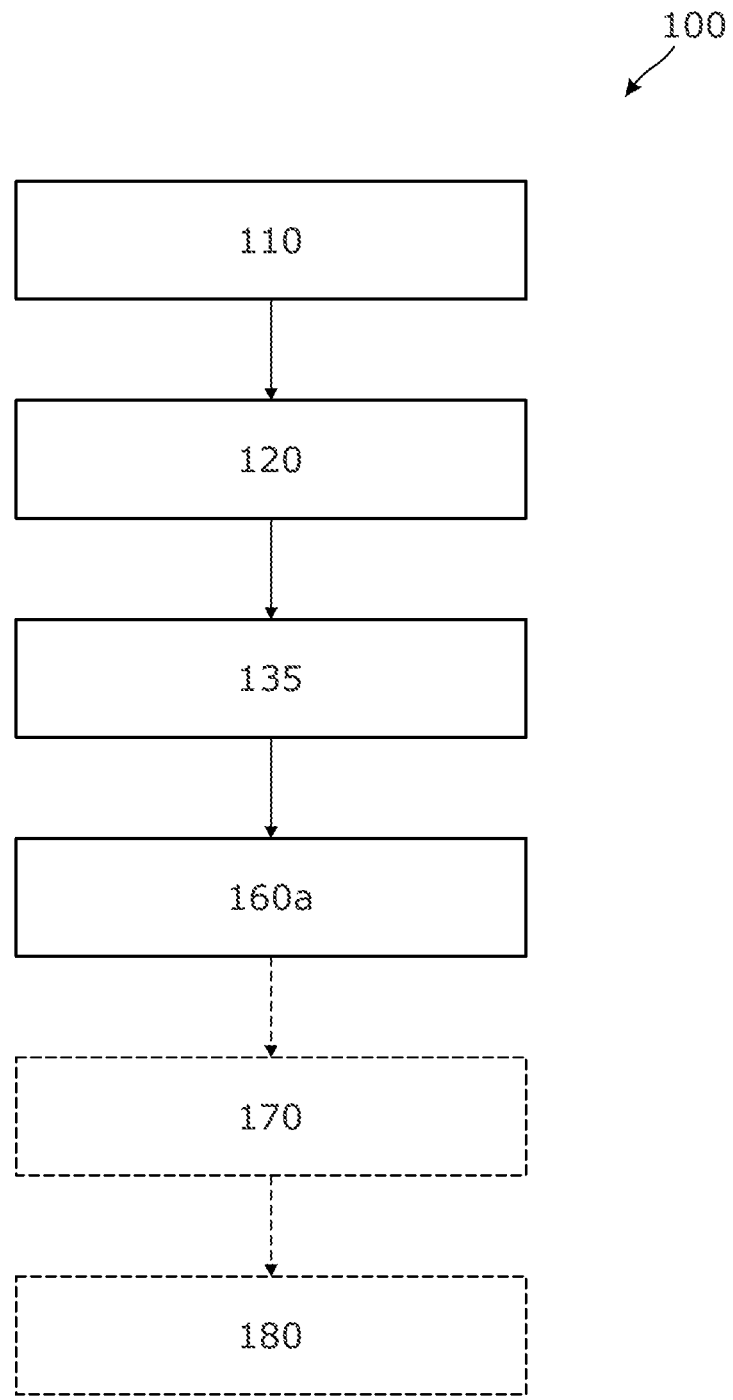
Figure 8:
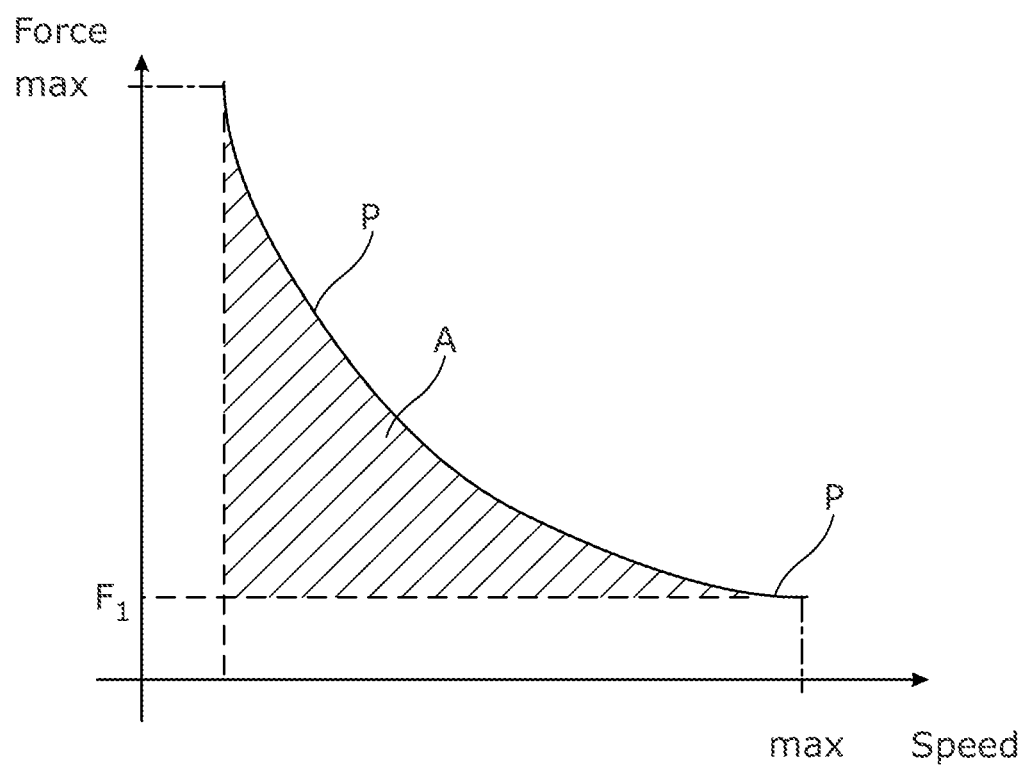

The invention and its many advantages will be described in more detail below with reference to the accompanying schematic drawings, which for the purpose of illustration show some non-limiting embodiments and in which:

FIG. 1 shows a downhole self-propelling wireline tool according to the invention having two wheel sections driven by one electric motor and one hydraulic pump, FIG. 2 shows another downhole self-propelling wireline tool according to the invention having two wheel sections driven by one electric motor and two hydraulic pumps, FIG. 3 shows yet another downhole self-propelling wireline tool according to the invention having two wheel sections, each wheel section being driven by one electric motor and one hydraulic pump, FIG. 4 shows yet another downhole self-propelling wireline tool comprising a compression sub and an operational tool for performing an operation in the well, such as milling with a bit, FIG. 5 shows a downhole self-propelling wireline tool control method according to the present invention with some optional steps, FIG. 6 shows another downhole self-propelling wireline tool control method with some optional steps of performing an operation downhole, FIG. 7 shows another downhole self-propelling wireline tool control method, and FIG. 8 shows a graph of the power curve in relation to the pulling force and speed of the tool.

All the figures are highly schematic and not necessarily to scale, and they show only those parts which are necessary in order to elucidate the invention, other parts being omitted or merely suggested.

FIG. 1 shows a downhole self-propelling wireline tool 1 for propelling a tool forward in a wellbore 2 and potentially also for providing weight on a bit 39 while performing an operation, as shown in the tool 1 of FIG. 2. The downhole self-propelling wireline tool 1 comprises a tool body 3 and an electric motor 4 operating at an operational rotational speed and powered by a wireline 5. The downhole self-propelling wireline tool 1 further comprises a plurality of projectable arm assemblies 6 movably connected at a first arm end 7 with the tool body 3 and projectable from the tool body 3 by means of a first fluid having a first fluid pressure, and a plurality of wheels 8 for contacting a wall 9 of the well. Each wheel 8 comprises a hydraulic motor 10 for rotation of the wheel 8 to provide a self-propelling movement, and each wheel 8 is connected with a second arm end 11 of one of the projectable arm assemblies 6, so that the wheel engages the wall when the arm is projected. The electric motor 4 is configured to drive by rotation a first hydraulic pump 12 for generation of a second fluid pressure for driving the hydraulic motor(s) 10 rotating the wheel(s) 8. The downhole self-propelling wireline tool 1 is connected to a second end 47 of the wireline 5, a first end of the wireline being connected to a power supply (not shown) at the surface or seabed. The downhole self-propelling wireline tool 1 further comprises an electric control unit 18 and a cable head 44 for connecting the tool to the wireline 5. The downhole self-propelling wireline tool 1 also comprises a hydraulic section 15 for controlling the fluid from the pump 12 to the wheels 8 and arm assemblies 6.

The electric control unit 18 controls the rotational speed of the electric motor 4 and thus also the rotational speed of the pump as well as the tool speed of the downhole self-propelling wireline tool 1 along the longitudinal extension of the well as the pump generates a fluid flow into the wheels 8. At the beginning of the well, closest to the top of the well, the downhole self-propelling wireline tool 1 requires very little force for pulling the wireline 5 along with the tool, but as the downhole self-propelling wireline tool 1 proceeds down the well, the tool 1 requires an increasing amount of force for pulling the wireline 5. As the required force increases, the wheels 8 need higher pressure to rotate, and the pump 12 thus needs more rotational force, i.e. motor output torque, from the motor 4. The wirelines used for intervention operations where such downhole self-propelling wireline tool 1 is used are rated to a maximum current limit depending on the length of the wireline or other wireline parameters. Thus, it is important that such a current limit is not exceeded. Knowing of the voltage either by assumption or measurement, a power limit P of the operation is also known, and this power limit P is shown in FIG. 8. The power limit may also be understood as the maximum allowable electric power usage of the wireline tool. When the motor output torque increases, the current demand increases correspondingly, and when the limit is reached the downhole self-propelling wireline tool 1 needs to reduce its speed, i.e. move along the power limit curve in FIG. 8. When operating the downhole self-propelling wireline tool at low speed, the maximum force available, e.g. for pulling the wireline is very high; however, if such high force is not utilised to its full extent the first pressure at which the projectable arms and thus the wheels are pressed against the inner face of the casing/well tubular metal structure may be unnecessarily high causing unnecessary wear of the wheels. Likewise, when operating the downhole self-propelling wireline tool without using a lot of force, e.g. for pulling in the wireline, then the downhole self-propelling wireline tool may drive at a high speed; however, if the downhole self-propelling wireline tool drives at high speed into an obstruction, the downhole self-propelling wireline tool may shut down or be sufficiently damaged. Therefore, the method may comprise the step of reducing the second fluid pressure and/or the first fluid pressure to avoid unnecessary wear of the wheels or avoiding shut down.

A method 100 for controlling a tool string having the downhole self-propelling wireline tool 1 is illustrated in FIG. 5. The method comprises running 110 the downhole self-propelling wireline tool 1 into the wellbore 2, supplying 120 electric power to the downhole self-propelling wireline tool to operate the downhole self-propelling wireline tool at a first speed to urge the downhole self-propelling wireline tool through the wellbore 2 at a first force, determining 130 a motor output torque of the electric motor 4, determining 140 a maximum allowable motor rotational speed based on the motor output torque for the purpose of comparing 150 the operational rotational speed with the maximum allowable motor rotational speed, and then adjusting 160 the operational rotational speed of the electric motor 4 based on the comparison in order to adjust the first speed to a second speed if the operational rotational speed is higher than the maximum allowable motor rotational speed.

Thereby, a very simple way of adjusting the speed of the hydraulically driven downhole self-propelling wireline tool 1 is provided as only the electric motor 4 is adjusted, and the more complex hydraulic section 15 is not adjusted to change the speed of the hydraulically driven downhole self-propelling wireline tool 1. Adjustment of the electric motor also effects the speed faster as adjustment of hydraulic is always slower than electronic adjustment.

The speed of the hydraulically driven downhole self-propelling wireline tool 1 is thus adjusted continuously using all available power, if needed, i.e. below the current limit, either for driving at a maximum speed or at the required force and the corresponding maximum allowable speed. The hydraulically driven downhole self-propelling wireline tool 1 is able to drive at maximum speed until the force needed to pull the wireline increases to a first force F1 at the power limit curve (shown in FIG. 8), above which first force F1 the speed and thus the rotational speed of the electric motor 4 needs to be reduced so that the current limit is not exceeded, but the speed of the tool 1 is merely adjusted to the speed at which the electric motor 4 is still able to provide enough torque for the tool to pull the wireline 5. The hydraulically driven downhole self-propelling wireline tool 1 thus controls itself to continuously adjust its speed to a maximum without exceeding the current limit of the wireline 5 and without substantially reducing the maximum pulling.

The known hydraulically driven downhole self-propelling wireline tools may turn off one or more drive sections and thus drive faster at a maximum speed and with a very low first pulling force, using the remaining active drive section; when more pulling force is needed, all drive sections are turned on, and the downhole self-propelling wireline tool then drives at a second minimum speed and a maximum pulling force, as shown in FIG. 8. When at a certain point in the well, the pulling force needed to pull the wireline becomes too high while the tool is driving at maximum speed due to the current limit in the wireline, and then the known self-propelling wireline tools having only two modes need to turn on the other drive sections in order to continue and are only able to drive much slower from that point onwards. From that point and until reaching the point where maximum pulling force is needed, the known self-propelling wireline tools do not use all available power, which is indicated as area A in FIG. 8. So even though some known self-propelling wireline tools are able to drive fast when no substantial pulling force is needed, the hydraulically driven downhole self-propelling wireline tool controlled according to the present method will arrive much faster at the destination in the well as the controlling of the hydraulically driven downhole self-propelling wireline tool makes it possible to adjust the speed continuously, using all available power, i.e. below the current limit. The known self-propelling wireline tools are often set to drive at a lower speed than the maximum speed as then the tool can generate more pulling force and thus drive further before having to turn on the other drive sections, and the known tools therefore often drive slower than the tool controlled according to the present invention.

In FIG. 8, the maximum speed of the hydraulically driven downhole self-propelling wireline tool 1 is based on the maximum allowed rotational speed of the electric motor 4, and the maximum pulling force is based on the minimum allowed rotational speed of the electric motor 4.

The power curve shown in FIG. 8 may be defined by determining the maximum allowable electric power usage of the wireline tool and determining the maximum allowable operational rotational speed of the electric motor based on the maximum allowable electric power usage at a predetermined motor output torque of the electric motor. When the operational rotational speed of the electric motor is reduced, the motor output torque of the electric motor may be increased. The line/curve P may be seen as a product of the motor output torque and the operational speed of the electric motor, where a reduction in speed allows for an increase in motor output torque, but an increase in speed limits the motor output torque allowed. If the operational rotational speed of the electric motor is too high at the determined motor output torque, so that the maximum allowable electric power usage of the wireline tool is not exceeded, the operational rotational speed may be reduced.

The motor output torque may continuously be determined from the electrical phases and by using each determined motor output torque, the maximum allowable operational rotational speed of the electric motor may be calculated and compared with the operational rotational speed of the electric motor, and if the operational rotational speed of the electric motor is higher than the maximum allowable operational rotational speed of the electric motor, the operational rotational speed of the electric motor may be reduced and if the operational rotational speed of the electric motor is lower than the maximum allowable operational rotational speed of the electric motor, the operational rotational speed of the electric motor may be increased. The curve P represents the maximum allowable electric power usage of the wireline tool and is defined by finding the limits on the speed of the operational rotational speed at a predetermined motor output torque. By performing this determination at two, three, four, five different rotational speeds of the electric motor, it is possible to define a power curve, where the method allows the wireline tool to be operated within the limits of the maximum allowable electric power usage, so that the wireline and the components of the wireline tool are protected from being operated beyond their capacity.

The curve P shown in FIG. 8 has a first axis that may be the motor output torque, while the second axis may be the operational rotational speed. Thus, if the product of the motor output torque and the operational rotational speed is above the curve P, then the operational rotational speed of the electric motor may be reduced to ensure that the wireline tool operates below the curve P and/or within the hatched area A, seen in FIG. 8. Likewise, if the product of the motor output torque and the operational rotational speed is above the curve P, the operational rotational speed of the electric motor may be increased to ensure that the wireline tool operates at the maximum allowable speed for optimising full usage of the maximum allowable electric power usage of the wireline tool.

The electrical power corresponds to the mechanical power needed to e.g. rotate and drive the pump but the mechanical power is less than the electrical power due to electrical loss in the tool components, the motor etc. The loss in the motor is higher at high torque and low rotational speed than low torque and high rotational speed.

In the method of FIG. 5, the adjusting of the operational rotational speed of the electric motor 4 based on the comparison is performed independently of any condition of the wireline 5, such as drag in the wireline, wireline tension or wireline resistance. The wireline is somewhat flexible and may vary from well to well, and therefore the present method is advantageous when there is no knowledge of such wireline conditions while the downhole self-propelling wireline tool is running in the well, and the method also suits all wells and wirelines, even though no advanced control wireline unit is available at the rig or top of the well.

Furthermore, in the method of FIG. 5, the adjusting of the operational rotational speed of the electric motor 4 based on the comparison is performed independently of any pump condition, such as pump flow, pump pressure or stroke length. Due to the limited space in a well, it is difficult to make room in the pump section for electric wires for measurements as then the pumping capacity would be substantially reduced, and the maximum speed of the downhole self-propelling wireline tool would likewise be reduced. Thus, by controlling the downhole self-propelling wireline tool 1 according to the present method the hydraulic pump is designed using the full diameter of the tool, and the maximum speed is thus substantially increased compared to known tools.

Thus, the first speed of the downhole self-propelling wireline tool 1 is adjusted to the second speed by adjusting the operational rotational speed of the electric motor 4. Control is performed without determining the power used, but only by determining 130 a motor output torque of the electric motor 4, determining 140 a maximum allowable motor rotational speed based on the motor output torque, and comparing 150 the operational rotational speed with the maximum allowable motor rotational speed.

In FIG. 5, the method of controlling the downhole self-propelling wireline tool 1 may further comprise determining 145 the rotational speed of the electric motor 4, and the determining of the output torque of the electric motor may be performed by measuring 125 the current over the three phases in the electric motor.

As can be seen in FIG. 5, the method may also comprise measuring 135 a current demand of/input to the electric motor 4 and measuring 135*b* a voltage input to the electric motor, and then the determining 140 of a maximum allowable motor speed based on the motor output torque is also based on a measured current and a measured voltage of the electric motor. By measuring the actual current demand and voltage of the electric motor 4, the maximum allowable motor speed can be determined more precisely as the efficiency of the electric motor varies depending on the operational rotational speed of the electric motor. Thus, at a high rotational speed the current demand is relatively lower than at a low rotational speed for the same output power of the motor due to the varying efficiency of the electric motor 4, and the maximum power may therefore be varied to be somewhat larger at high rotational speed than when assuming the maximum power is constant. In this way, the downhole self-propelling wireline tool 1 is able to drive at an even higher maximum speed, and the maximum pulling force is also increased.

The allowable effect of the electric motor 4 varies with temperature so that at lower temperatures, e.g. below 200° C., the electric motor may run at higher effect than at higher temperatures. The downhole self-propelling wireline tool may therefore comprise a temperature sensor for measuring the temperature of the electric motor and adjusting the allowable effect level of the motor accordingly.

As shown in FIG. 7, the adjusting 160*a* of the operational rotational speed of the electric motor 4 may also be based on a measured current demand of the electric motor or a calculated load on the electric motor.

The adjustment of the operational rotational speed of the electric motor may be performed continuously so as to optimise the pulling force F and speed of the tool to keep the power demand below the power curve P of the graph in area A shown in FIG. 8 in relation to the pulling force and speed of the tool. In this way, all available power is used in the most optimal way to ensure that the downhole self-propelling wireline tool drives at maximum speed while being able to provide the pulling force needed at any location in the well.

In FIG. 1, the electric control unit 18 comprises a motor driver 28, a master and/or a voltage inverter. According to the method of FIG. 5, the electric control unit 18 determines 145 or the motor driver 28 determines 145*a* an operational rotational speed of the electric motor 4, and the motor driver 28 is configured to measure 125 current over the three phases of the motor to determine 130 a motor output torque of the electric motor 4. The electric control unit 18 or the motor driver 28 is configured to determine 140 a maximum allowable motor rotational speed based on the motor output torque and to compare 150 the operational rotational speed with the maximum allowable motor rotational speed, and then adjust 160 the operational rotational speed of the electric motor 4 based on the comparison in order to adjust the first speed to a second speed if the operational rotational speed is higher than the maximum allowable motor rotational speed. Optionally, determining 140 a maximum allowable motor rotational speed based on the motor output torque may also be based on pre-set values 142 for maximum power or maximum current. Furthermore, the electric control unit 18 or the motor driver 28 may measure 135 a current demand of/input to the electric motor 4 and measure 135b a voltage input to the electric motor, and determining 140 a maximum allowable motor speed based on the motor output torque may thus also be based on a measured current and a measured voltage of the electric motor 4.

In FIG. 6, the method comprises continuously measuring 130d the second fluid pressure by means of a first pressure sensor 49, and the adjusting 160c of the rotational speed of the electric motor 4 is based on the second fluid pressure as a supplement to or instead of steps 130-150.

The method as shown in FIGS. 5, 6 and 7 further comprises controlling 170 the first fluid pressure based on the second fluid pressure by means of a first controllable valve 16 in the hydraulic section 15 of the downhole self-propelling wireline tool 1. The method may optionally further comprise determining 180 the load on the electric motor 4 based on the torque output.

In FIG. 6, the method comprises continuously measuring 130b the second fluid pressure of the second fluid, and the adjusting 160d of the operational rotational speed of the electric motor 4 is based on the second fluid pressure as a supplement to or instead of steps 130-150.

As shown in FIG. 1, the downhole self-propelling wireline tool 1 further comprises the first pressure sensor 49 continuously measuring a second fluid pressure of a second fluid for powering each hydraulic motor 10 rotating the wheels 8 and the hydraulic section 15 comprising the first controllable valve 16 controlling a first fluid pressure for projecting the arm assemblies 6 based on the second fluid pressure. The hydraulic section 15 may merely adjust the first controllable valve 16 for controlling the first fluid pressure based on the second pressure and thus ensure that sufficient power is provided to the wheel arms 6, but not more than needed. By having a first controllable valve 16 controlling the first fluid pressure based on the second pressure, the continuous control of the hydraulically driven downhole self-propelling wireline tool 1 is optimised even further so that no power is wasted on projecting the projectable arm assemblies 6 out towards the wall of the well other than what is needed for optimal friction between the wheels 8 and the wall to drive the hydraulically driven downhole self-propelling wireline tool 1 forward.

By having the first controllable valve 16 controlling the first fluid pressure based on the second pressure, the wheels 8 are not pressed more outwards than needed. The higher the second pressure, the higher the first pressure needs to be in order to propel the downhole self-propelling wireline tool 1 forward in the well in the most optimal manner. When having a low second pressure, the first pressure is adjusted to match the low second pressure so that power is not wasted on providing a first fluid pressure higher than needed. Furthermore, if the first fluid pressure is higher than the optimal first fluid pressure matching the present second fluid pressure, then too much friction is applied to the wall of the well, compromising the maximum available velocity of the downhole driving unit.

The first pressure sensor 49 continuously measures the second fluid pressure, and data representing the measured second fluid pressure is communicated to the electric control unit. When the second fluid pressure changes, the electric control unit electrically controls the first controllable valve by conducting electric power to the valve for moving the valve to a more or less open position, and thus the first controllable valve 16 controls the first fluid pressure based on the second fluid pressure. Thus, the sensor and the valve can be seen as a feedback loop where the measurement is fed back to control the valve, and thus an increase or decrease in the second fluid pressure is utilised to provide a resulting action on the valve to increase or decrease the pressure projecting the arms based on the rotational speed of the wheels.

In FIG. 1, the first hydraulic pump 12 generates the first fluid pressure for projection of the plurality of projectable arm assemblies 6, and in FIG. 2 the downhole self-propelling wireline tool 1 further comprises a second hydraulic pump 14 for generation of the first fluid pressure for projection of the plurality of projectable arm assemblies 6.

As shown in FIG. 1, the hydraulic section 15 further comprises a second controllable valve 17 controlling the second fluid pressure. The controllable valve(s) 16, 17 is/are electronically adjustable. The downhole self-propelling wireline tool 1 has two wheel/drive sections 30 where one is rotated 90 degrees around the circumference of the tool in relation to the other in order to centralise the tool in the well. In other operations where centralisation is not important, the downhole self-propelling wireline tool 1 only has one drive section 30, as shown in FIG. 2. Such operation could be a milling or grinding operation in which the downhole self-propelling wireline tool comprises an operational tool as shown in FIG. 2.

The downhole self-propelling wireline tool 1 further comprises a compensator 35 for providing a predetermined overpressure in the tool so that the well fluid does not enter into the tool and jeopardise the function of the tool, and so that the dirty well fluid is not mixed with the hydraulic fluid in the tool.

The downhole self-propelling wireline tool 1 also comprises a surface readout module 29 for sending measured tool parameters, such as the first fluid pressure, the second fluid pressure, the operational rotational speed of the electric motor 4 and/or the motor output torque, to surface.

In FIG. 2, the downhole self-propelling wireline tool 1 comprises an operational tool 38, such as a logging tool 38b (shown in FIG. 4) or a machining tool 32 having the bit 39 for performing a machining operation and a compression sub 33 comprising a load cell 34 adjacent to the machining tool in order to measure the actual weight on the bit. The operational tool 38 further comprises an electric control unit 40, a compensator 41, an electric motor 42 and a gear section 43 for rotating the bit 39 at another speed than the rotational speed of the motor 42, often at a lower speed. The compression sub 33 comprising the load cell 34 is arranged between the electric control unit 40 and the drive section 30 comprising the wheels 8 on the projectable arm assemblies 6.

When the downhole self-propelling wireline tool 1 further comprises the logging tool 38b, and the downhole self-propelling wireline tool has propelled itself to the point where the logging operation is to be performed, then the operational rotational speed is set at a predetermined constant operational rotational speed of the electric motor 4.

When the downhole self-propelling wireline tool 1 further comprises the operational tool 32 having the bit 39 for performing an operation downhole, such as milling, and the downhole self-propelling wireline tool has propelled itself to the point where the milling operation is to be performed, the method further comprises measuring 130b the second fluid pressure, estimating 140c a weight on bit (WOB), comparing 150a the estimated weight on bit with a predetermined weight on bit, and adjusting 160e the second fluid pressure based on the comparison, as shown in FIG. 6. The steps 130b, 140c, 150a and 160e may be a supplement to or instead of steps 130-160.

When the downhole self-propelling wireline tool 1 further comprises the compression sub 33 and the operational tool 32 having the bit 39 for performing an operation downhole, such as milling, the method may further comprise measuring 130c a weight on the bit by means of the compression sub, comparing 150b the measured weight on bit with a predetermined weight on bit, and adjusting 160f the second fluid pressure based on the comparison, as shown in FIG. 6. The steps 130c, 150b and 160f may be a supplement to or instead of steps 130-160.

In FIG. 3, the electric motor 4 is a first electric motor 4, and the downhole self-propelling wireline tool 1 comprises a second electric motor 22 driving a second hydraulic pump 14, the first electric motor 4 driving the first hydraulic pump 12. The first electric motor 4 thus drives a first hydraulic pump 12 for generating fluid to project the projectable arm assemblies 6 and generating fluid for rotating the wheels 8 of one drive section 30a, and the second electric motor 22 thus drives a second hydraulic pump 14 for generating fluid to project the projectable arm assemblies 23 and fluid to rotate the wheels 24 of a second drive section 30b. The second hydraulic pump 14 generates a third fluid pressure for projection of a second plurality of projectable arm assemblies 23. The second hydraulic pump 14 generates a fourth fluid pressure for driving the hydraulic motor(s) 10, rotating a second plurality of wheels 24. The hydraulic section 15 for the first drive section 30a is a first hydraulic section 15, and the downhole self-propelling wireline tool 1 further comprises a second hydraulic section 25 comprising a third controllable valve 26 controlling the third fluid pressure and a fourth controllable valve 27 controlling the fourth fluid pressure. Both the first controllable valve 16 and the second controllable valve 17 are electronically controllable by means of the electric control unit 18, and the third controllable valve 26 and the fourth controllable valve 27 are electronically controllable by means of a second electric control unit 18b. The first electric motor 4 and/or the second electric motor 22 is/are (a) synchronous motor(s).

The tool string of FIG. 3 is thus two downhole self-propelling wireline tools 1 mounted as one wireline tool where each has a separate electric control unit, a separate electric motor, one or two separate hydraulic pumps, a separate hydraulic section and one or more separate drive sections 30. The first downhole self-propelling wireline tool 1a comprises the electric control unit 18, the electric motor 4, one or two hydraulic pumps 12, the hydraulic section 15 and the drive section 30, 30a with wheels 8 on projectable arm assemblies 6. The second downhole self-propelling wireline tool 1b comprises the electric control unit 18b, the second electric motor 22, one or two hydraulic pumps 14, the hydraulic section 15 and the drive section 30, 30b with wheels 24 on projectable arm assemblies 23. The plurality of projectable arm assemblies 23 are movably connected at a first arm end 7b with the tool body 3, and each wheel comprises a hydraulic motor 10b for rotation of the wheel to provide a self-propelling movement, each wheel being connected with a second arm end 11b of one of the arm assemblies 23. The first downhole self-propelling wireline tool 1a is connected to the cable head 44 and the wireline 5. The hydraulic section 15 is configured to measure the first and second fluid pressures by means of the first pressure sensor 49 and a second pressure sensor 48 and to control the valves based on the measured first and second fluid pressures. The second hydraulic section 25 is configured to measure the third and fourth fluid pressures by means of a third pressure sensor 48b and a fourth pressure sensor 49b and to control the valves based on the measured third and fourth fluid pressures. The controllable valve(s) 16, 17, 26, 27 is/are (a) controllable pressure relief valve(s). The power to the tool string is thus divided equally between the first and second electric motors 4, 22 so that each motor is limited to half of the current limit to ensure that the tool string does not exceed the allowed current limit on the wireline.

The step of running 110 comprises running both the first and second downhole self-propelling wireline tools 1, 1a, 1b into the wellbore 2, and the step of supplying 120 electric power comprises supplying electric power to both the first and second downhole self-propelling wireline tools 1, 1a, 1b to operate the first and second downhole self-propelling wireline tools 1, 1a, 1b at a first speed to urge the tool string through the wellbore 2 at a first force, and the step of determining 130 comprises determining a motor output torque of both the first and second electric motors 4, 22, and the step of determining 140 comprises determining a maximum allowable motor rotational speed based on the motor output torque of both the first and second electric motors 4, 22, and the step of comparing 150 comprises comparing the operational rotational speed of both the first and second electric motors 4, 22 with the maximum allowable motor rotational speed, and wherein the step of adjusting 160 comprises adjusting the operational rotational speed of both the first and second electric motors 4, 22 based on the comparison in order to adjust the first speed to a second speed if the operational rotational speed is higher than the maximum allowable motor rotational speed.

In FIG. 3, the electric control unit(s) 18 further comprise(s) a voltage control unit 19 having an overvoltage protection unit, so that voltage fed to the tool is kept more constant, and an electric current measuring unit 20. In FIG. 4, the electric control unit 18 comprises a capacitor 50 functioning as an energy storage unit or accumulator. The downhole self-propelling wireline tool 1 further comprises the machining tool 32 for performing a machining operation and the compression sub 33 comprising the load cell 34 adjacent to the machining tool 32. In another embodiment, the electric control unit(s) 18 control(s) the controllable valve(s) 16, 17, 26, 27 based on the electric current and/or electric voltage measured by the electric control unit 18.

In FIG. 3, each electric motor 4, 22 may also comprise a power or current-limiting unit 31 in order to distribute a first part of the current from the wireline 5 to power the first electric motor 4 and a second part of the current to power the second electric motor 22. The first and second downhole self-propelling wireline tools 1, 1a, 1b may be electrically connected in parallel. The downhole self-propelling wireline tool 1 may also comprise a current distribution unit 21 in order to distribute a first part of the current from the wireline 5 to power the first electric motor 4 and a second part of the current to power the second electric motor 22. The current distribution unit 21 may be applied instead of the power-limiting units 31 in order to distribute a first part of the current from the wireline 5 to power the first electric motor 4 and a second part of the current to power the second electric motor 22.

By having a power-limiting unit, the power can be distributed optimally as a first part of the current from the wireline to power the first electric motor and a second part of the current to power the second electric motor. This enables driving the downhole self-propelling wireline tool string having at least one pump for each drive section without the first downhole self-propelling wireline tool 1a and the second downhole self-propelling wireline tool 1b coming out of syncronisation so that one is driving faster than the other and thus functions as a "brake".

By having an electric motor and a pump for each drive section, the downhole self-propelling wireline tool string 1 is able to drive at full speed as one drive section and with double pulling force as two drive sections. The power curve, e.g. 3 kW, of a known tool string having one pump for driving two drive sections starts at the same maximum force as the power curve of the tool string having at least one pump for each drive section, but the power curve (shown in FIG. 8) of the tool string having at least one pump for each drive section extends to the point having twice the speed than that of the known tool string. Thus, at low speed the available pulling force is the same for the known tool string and the tool string of the present invention, but the downhole self-propelling wireline tool string 1 having at least one pump for each drive section is at high speed able to drive twice as fast as the known tool string having only one pump for driving two drive sections. This is due to the fact that the pumped fluid does not have to travel past one drive section to be delivered to the next, and thus no energy is wasted in the transition from one drive section to the next drive section. By having one pump for one drive section, the diameter of the fluid channels in the drive section can be made larger than when the pump has to provide fluid to more than one drive section. The overall diameter of the tool string 1 is limited by the well, and the pump is therefore often a limiting factor as more pumping capacity would require a larger diameter. By having only one drive section, the pumping force is used directly, and the fluid channel can be made larger, for which reason the limited current in the wireline is used more efficiently than in the known tool strings where several drive sections are driven by one pump.

In FIG. 4, the downhole self-propelling wireline tool 1 is a user interface 36 at a surface 37 for controlling at least part of the downhole self-propelling wireline tool 1. Thus, the field engineer may be informed of the current limit of the wireline/cable and through the user interface set the current limit for each motor of the tool, and the power-limiting units 31 or the current distribution unit 21 distributes the current equally between the first downhole self-propelling wireline tool 1a and the second downhole self-propelling wireline tool 1b forming the tool 1, so that both are able to drive at the same speed and therefore drive the tool string at the same speed. The first electric motor 4 may require more power than the second electric motor 22 in order to drive the tool string at the same speed, but this is possible as the first and second downhole self-propelling wireline tools 1, 1a, 1b are electrically connected in parallel. The downhole self-propelling wireline tool string may further comprise a stroking tool, even though not shown.

A stroking tool is a tool providing an axial force. The stroking tool comprises an electric motor for driving a pump. The pump pumps fluid into a piston housing to move a piston acting therein. The piston is arranged on the stroker shaft. The pump may pump fluid out of the piston housing on one side and simultaneously suck fluid in on the other side of the piston.

By "fluid" or "well fluid" is meant any kind of fluid that may be present in oil or gas wells downhole, such as natural gas, oil, oil mud, crude oil, water, etc. By "gas" is meant any kind of gas composition present in a well, completion or open hole, and by "oil" is meant any kind of oil composition, such as crude oil, an oil-containing fluid, etc. Gas, oil and water fluids may thus all comprise other elements or substances than gas, oil and/or water, respectively.

By "casing" or "well tubular metal structure" is meant any kind of pipe, tubing, tubular, liner, string, etc., used downhole in relation to oil or natural gas production.

Although the invention has been described above in connection with preferred embodiments of the invention, it will be evident to a person skilled in the art that several modifications are conceivable without departing from the invention as defined by the following claims.

The invention claimed is:

1. A method for controlling a tool string having a downhole self-propelling wireline tool having wheels rotated by means of hydraulics and connected to projectable arm assemblies projected by hydraulics, comprising:
   running the downhole self-propelling wireline tool into a wellbore, the downhole self-propelling wireline tool being connected to a second end of a wireline, and a first end of the wireline being connected to a power supply, the downhole self-propelling wireline tool having a tool body and a plurality of wheels rotated by means of hydraulics, and each wheel being connected to a projectable arm assembly projectable from the tool body by means of hydraulic fluid from a first hydraulic pump, the downhole self-propelling wireline tool having an electric motor rotating at an operational rotational speed for driving the first pump,
   defining the maximum allowable electric power usage of the wireline tool,
   supplying electric power to the downhole self-propelling wireline tool to operate the downhole self-propelling wireline tool at a first speed to urge the downhole self-propelling wireline tool through the wellbore at a first force,
   determining a first maximum allowable operational rotational speed of the electric motor based on the maximum allowable electric power usage at a first predetermined motor output torque of the electric motor,
   determining a motor output torque of the electric motor, and
   comparing whether the operational rotational speed exceeds the maximum allowable operational rotational speed of the electrical motor at the determined motor output torque,
   wherein the method further comprises adjusting the operational rotational speed of the electric motor based on the comparison in order to adjust the first speed to a second speed if the operational rotational speed is higher than the maximum allowable motor rotational speed.

2. The method according to claim 1, wherein the method further comprises determining a second maximum allowable operational rotational speed of the electric motor based on the maximum allowable electric power usage at a second predetermined motor output torque of the electrical motor.

3. The method according to claim 1, wherein the method further comprises determining a third, fourth or a subsequent maximum allowable operational rotational speed of the electric motor based on the maximum allowable electric power usage at a third, fourth or subsequent predetermined motor output torque of the electrical motor.

4. The method according to claim 1, wherein adjusting the operational rotational speed of the electric motor based on the comparison is performed independently of any condition of the wireline.

5. The method according to claim 1, wherein adjusting the operational rotational speed of the electric motor based on the comparison is performed independently of any pump condition.

6. The method according to claim 1, wherein adjusting the operational rotational speed of the electric motor based on the comparison is performed independently of any representation of the speed of the downhole self-propelling wireline tool.

7. The method according to claim 1, wherein the first speed of the downhole self-propelling wireline tool is adjusted to the second speed by adjusting the operational rotational speed of the electric motor.

8. The method according to claim 1, further comprising determining the operational rotational speed of the electric motor.

9. The method according to claim 1, wherein determining the output torque of the electric motor is performed by measuring the current over three phases in the electric motor.

10. The method according to claim 1, further comprising measuring a current demand of input to the electric motor and measuring a voltage input of the electric motor.

11. The method according to claim 1, wherein determining a maximum allowable motor speed based on the motor output torque is also based on a measured current and a measured voltage of the electric motor.

12. The method according to claim 1, wherein the adjusting of the operational rotational speed of the electric motor is based on a measured current demand of the electric motor or a calculated load on the electric motor.

13. The method according to claim 1, wherein each wheel comprises a hydraulic motor for rotation of the wheel by a second fluid having a second fluid pressure and provides a self-propelling movement, each wheel being connected with a second arm end of one of the projectable arm assemblies, the plurality of projectable arm assemblies being movably connected at a first arm end with the tool body and being projectable from the tool body by means of a first fluid having a first fluid pressure, and the downhole self-propelling wireline tool further comprising a pressure sensor measuring the second fluid pressure.

14. The method according to claim 13, wherein each hydraulic motor is driven by a second fluid having a second fluid pressure from the first hydraulic pump or a second hydraulic pump driven by the electric motor.

15. The method according to claim 14, wherein the adjusting of the rotational speed of the electric motor is based on the second fluid pressure.

16. The method according to claim 13, further comprising controlling the first fluid pressure based on the second pressure by means of a first controllable valve in a hydraulic section of the downhole self-propelling wireline tool.

17. A hydraulically driven downhole self-propelling wireline tool configured to perform the method according to claim 1.

* * * * *